United States Patent [19]

Kimura

[11] Patent Number: 6,021,308
[45] Date of Patent: *Feb. 1, 2000

[54] ON-VEHICLE DATA COMMUNICATION SYSTEM AND METHOD

[75] Inventor: Toshiyuki Kimura, Saitama-ken, Japan

[73] Assignee: Pioneer Electronic Corporation, Tokyo-to, Japan

[*] Notice: This patent is subject to a terminal disclaimer.

[21] Appl. No.: 08/878,287

[22] Filed: Jun. 18, 1997

Related U.S. Application Data

[62] Division of application No. 08/543,284, Oct. 16, 1995, Pat. No. 5,697,048.

[30] Foreign Application Priority Data

Oct. 20, 1994 [JP] Japan ................................. 6-255339

[51] Int. Cl.[7] .................................................. H04N 7/10
[52] U.S. Cl. ............................... 455/6.3; 348/8; 348/10; 455/4.1
[58] Field of Search ................ 348/6, 7, 8, 9, 348/10, 11, 12, 420, 476, 567, 909; 455/3.1, 4.1, 4.2, 6.1, 6.2, 6.3; H04N 7/10, 7/12, 7/14

[56] References Cited

U.S. PATENT DOCUMENTS

| | | |
|---|---|---|
| 4,866,515 | 9/1989 | Tagawa et al. . |
| 4,896,209 | 1/1990 | Matsuzaki et al. . |
| 4,897,714 | 1/1990 | Ishise . |
| 5,132,992 | 7/1992 | Yurt .......................................... 375/122 |
| 5,220,419 | 6/1993 | Sklar et al. .......................... 455/6.3 X |
| 5,289,272 | 2/1994 | Rabowsky et al. .......................... 348/8 |
| 5,305,465 | 4/1994 | Flach ........................................ 455/6.1 |
| 5,311,302 | 5/1994 | Berry et al. ............................... 348/14 |
| 5,481,478 | 1/1996 | Palmieri et al. ..................... 455/4.1 X |
| 5,550,847 | 8/1996 | Zhu ........................................... 371/32 |
| 5,697,048 | 12/1997 | Kimura .................................... 455/6.3 |

*Primary Examiner*—Nathan Flynn
*Attorney, Agent, or Firm*—Kane, Dalsimer, Sullivan and Levy, LLP

[57] ABSTRACT

An on-vehicle data communication system is provided with at least one master unit, a plurality of slave units and a communication bus. Each of the slave units is provided with: a first receiving device for receiving broadcast communication data through the communication bus; a first judgement device for judging whether or not the first receiving device failed to normally receive the broadcast communication data; and a first transmission device for transmitting acknowledge data to indicate a failure in reception of the first receiving device, if the first judgement device judges that the first receiving device failed to normally receive. The master unit is provided with: a second transmission device for transmitting the broadcast communication data to the slave units; a second receiving device for receiving the transmitted acknowledge data; a second judgement device for judging whether or not the acknowledge data corresponding to the transmitted broadcast communication data are received by the second receiving device; and a process control device for performing a predetermined process to cope with the failure of the first receiving device.

6 Claims, 8 Drawing Sheets

ON-VEHICLE DATA COMMUNICATION SYSTEM AND METHOD

This is a division of application Ser. No. 08/543,284, filed Oct. 16, 1995 now U.S. Pat. No. 5,697,048.

BACKGROUND OF THE INVENTION

1. Field of the Invention

The present invention generally relates to a data communication system and method, and more particularly to an on-vehicle type data communication system and method suitable for use in a network of components of an on-vehicle type AV (Audio Visual) system.

2. Description of the Related Art

Recently, on-vehicle audio systems have been changing from systems, which give the user only audio information such as music, to systems which allow the user to enjoy both audio and visual information. Systems with both audio and visual capabilities are known as AV (Audio Visual) systems.

The on-vehicle type AV system is provided with various kinds of audio and visual components. For example, the audio components may include a cassette tape deck, a radio tuner, a CD (Compact Disc) player, etc., while the visual components may include a TV (TeleVision) tuner, a navigation system, etc. Audio signals produced by some of these components are amplified by an amplifier and reproduced from loudspeakers in the automobile. Video signals produced by other components are displayed on a display unit mounted in the automobile. Today, the AV system components are controlled by means of digital technology, i.e., by respective controllers in the form of microcomputers.

The components of such an AV system are required to be controlled systematically in order to achieve a systematic operation of the components. To meet this requirement, the controllers of the respective components are connected to each other by a communication bus network, so that control data of the components will be transmitted to each other through the communication bus.

In the above mentioned network, the master unit transmits transmission data to a plurality slave units so as to allow all of the slave units to receive the transmission data substantially at the same time (which is referred to as "broadcast communication data", hereinafter), so that the slave units which have received the broadcast communication data perform operations corresponding to the broadcast communication data respectively. This type of communication in which the master unit simultaneously transmits the data to a plurality of slave units is called as the "broadcast communication".

In the above mentioned network system, the slave units are constructed such that, if the transmission data are transmitted to a specified one of the slave units from the master unit, the specified one of the slave units transmits an acknowledge signal back to the master unit so as to inform the master unit of the fact that the specified one of the slave units has actually received the transmission data. This type of communication in which the master unit transmits the data to a specific one of the slave units is called as the "ordinary communication".

However, in case of transmitting the above mentioned broadcast communication data, if the system is constructed such that each of the slave units transmits the acknowledge signal to inform the reception of the broadcast communication data respectively, the communication time will be necessary, which is substantially equal to the communication time required in the case of individually transmitting the transmission data to each of the slave units as in the ordinary communication, resulting in the loss of the benefit of the broadcast communication. Accordingly, the system is constructed such that the acknowledge signal are not transmitted with respect to the broadcast communication data.

This type of construction does not cause any problem as long as the reliability of the communication itself of the broadcast transmission data can be kept high.

However, in case of the on-vehicle type network, since it is necessary to place the system at the vicinity of the noise source such as an engine, it is difficult to keep the reliability of the communication itself high.

Therefore, even if there exists a slave unit to which the master unit transmits the broadcast communication data and which has failed to receive the broadcast communication data, the master unit cannot acknowledge this fact of failure in reception on the side of the slave unit, so that the master unit continues the normal processes. Thus, the reliability in the data communication is certainly degraded.

SUMMARY OF THE INVENTION

It is therefore an object of the present invention to provide an on-vehicle type communication system and method which can improve the reliability in the data transmission in the broadcast communication.

The above object of the present invention can be achieved by a first on-vehicle data communication system provided with at least one master unit, a plurality of slave units and a communication bus for connecting the master unit and the slave units. Each of the slave units is provided with: a first receiving device for receiving broadcast communication data through the communication bus; a first judgement device for judging whether or not the first receiving device failed to normally receive the broadcast communication data which are supposed to be received by the first receiving device; and a first transmission device for transmitting acknowledge data to indicate a failure in reception of the first receiving device, if the first judgement device judges that the first receiving device failed to normally receive. The master unit is provided with: a second transmission device for transmitting the broadcast communication data to the slave units; a second receiving device for receiving the transmitted acknowledge data; a second judgement device for judging whether or not the acknowledge data corresponding to the transmitted broadcast communication data are received by the second receiving device; and a process control device for performing a predetermined process to cope with the failure of the first receiving device if the second judgement device judges that the acknowledge data are received.

In the communication operation of the first system of the present invention, at first, the broadcast communication data are transmitted from the second transmission device of the master unit to the slave units. Then, in each of the slave units, the broadcast communication data are received through the communication bus by the first receiving device. Here, it is judged whether or not the first receiving device failed to normally receive the broadcast communication data which are supposed to be received by the first receiving device. Then, the acknowledge data to indicate the failure in reception of the first receiving device is transmitted from the first transmission device of each of the slave units, onto the communication bus, if the first judgement device judges that the first receiving device failed to normally receive. On the other hand, in the master unit, the transmitted acknowledge data are received by the second receiving device, and it is judged by the second judgement device whether or not the acknowledge data corresponding to the transmitted broadcast communication data are received by the second receiving device of the master unit. Finally, a predetermined process to cope with the failure of the first receiving device is performed by the process control device if the second judgement device judges that the acknowledge data are received.

Accordingly, the reliability of the broadcast communication can be improved by use of the acknowledge data. At the same time, as long as the acknowledge data to indicate the failure in reception are not transmitted from the slave unit, the master unit can recognize that the communication is all right as for the corresponding slave unit, without the necessity of receiving the data indicating the normal reception of the broadcast data. Consequently, the communication time used for the transmission of the acknowledge data can be made very short, so that the advantage of the broadcast communication can be maintained while the reliability of the broadcast communication can be improved according to the first system of the present invention.

In one aspect of the first system of the present invention, the broadcast communication data may include a data block of control data and a data block of substantial data. The process control device controls the second transmission device to transmit the data block of substantial data again as the predetermined process, if the second judgement device judges that the acknowledge data are transmitted while the data block of substantial data are transmitted. Thus, the broadcast communication data can be certainly received by the slave units even if there happens a failure in reception, while the communication time for transmitting only the same data block of substantial data again can be made relatively short.

In another aspect of the first system of the present invention, the communication bus may be a twisted pair of conductors. Alternatively, the communication bus may be an optical communication cable. In those cases, the reliability of the transmission itself on the communication bus-can be certainly improved.

In another aspect of the first system of the present invention, the first receiving device may also receive ordinary communication data, while the second transmission device also may transmit the ordinary communication data. Each of the broadcast communication data and the ordinary communication data include data to differentiate the broadcast communication data and the ordinary communication data from each other. In this case, since the broadcast communication as well as the ordinary communication can be established in the on-vehicle data communication system, the system is very flexible and convenient. Here, by use of the data to differentiate the broadcast communication data and the ordinary communication data from each other, the slave unit can quite easily select which communication is to be established with the master unit.

In another aspect of the first system of the present invention, each of the master unit and the slave units may have a controller of each on-vehicle audiovisual components. The audiovisual components may include audio components such as a cassette tape deck, an AM/FM tuner and a multiple CD player, and visual components such as a TV tuner and a display unit. In this case, those audiovisual components can be systematically controlled by the broadcast communication.

In another aspect of the first system of the present invention, the first receiving device and the first transmission device may be provided with: a communication driver/receiver connected to the communication bus for receiving the broadcast communication data and transmitting the acknowledge data; and a communication control IC (Integrated Circuit) detachably connected to the communication driver/receiver for controlling the communication driver/receiver. Likewise, the second receiving device and the second transmission device may be provided with: a communication driver/receiver connected to the communication bus for receiving the broadcast communication data and transmitting the acknowledge data; and a communication control IC detachably connected to the communication driver/receiver for controlling the communication driver/receiver. In this case, just by changing the type of the communication driver/receiver, it is possible to cope with different types of communication bus such as the twisted pair of conductors and the optical communication cable, while the communication IC can remain unchanged. Further, it is possible to just replace a damaged communication driver/receiver which may be damaged by disturbance noise entering from the communication bus.

The above object of the present invention can be also achieved by a second on-vehicle data communication system provided with a plurality of communication units and a communication bus for connecting the communication units to each other. Each of the communication units is provided with: a master judgement device for judging whether each of the communication units is to function as a master unit or a slave unit in each communication on the communication bus; a first receiving device for receiving broadcast communication data through the communication bus, in case that each of the communication units is judged to function as a slave unit; a first judgement device for judging whether or not the first receiving device failed to normally receive the broadcast communication data which are supposed to be received by the first receiving device, in case that each of the communication units is judged to function as a slave unit; a first transmission device for transmitting acknowledge data to indicate a failure in reception of the first receiving device, if the first judgement device judges that the first receiving device failed to normally receive, in case that each of the communication units is judged to function as a slave unit; a second transmission device for transmitting the broadcast communication data to the communication units functioning as slave units, in case that each of the communication units is judged to function as a master unit; a second receiving device for receiving the transmitted acknowledge data, in case that each of the communication units is judged to function as a master unit; a second judgement device for judging whether or not the acknowledge data corresponding to the transmitted broadcast communication data are received by the second receiving device, in case that each of the communication units is judged to function as a master unit; and a process control device for performing a predetermined process to cope with the failure of the first receiving device if the second judgement device judges that the acknowledge data are received, in case that each of the communication units is judged to function as a master unit.

In the communication operation of the second on-vehicle data communication system, at first, it is judged by the master judgement device whether each of the communication units is to function as a master unit or a slave unit in each communication on the communication bus. Then, by the second transmission device of the communication unit which is judged to function as the master unit, the broadcast communication data are transmitted to the communication units which are judged to function as slave units. Then, in each of the communication units which is judged to function as the slave unit, the broadcast communication data-are received by the first receiving device through the communication bus, it is judged by the first judgement device whether or not the first receiving device failed to normally receive the broadcast communication data which are supposed to be received by the first receiving device, and the acknowledge data to indicate a failure in reception of the first receiving device are transmitted by the first transmission device, if the first judgement device judges that the first receiving device failed to normally receive. Then, in the communication unit which is judged to function as the master unit, the transmitted acknowledge data are received by the second receiving device, it is judged by the second judgement device whether or not the acknowledge data corresponding to the transmitted broadcast communication data are received by the second receiving device, and finally, the predetermined process to copP with the failure of the first receiving device is performed by the process control device, if the second judgement device judges that the acknowledge data are received.

Consequently, according to the second system of the present invention, the reliability of the broadcast communication can be improved in the same manner as the aforementioned first system of the present invention.

As one aspect of the second system of the present invention, the broadcast communication data may include priority data to indicate a priority order in an arbitration to use the communication bus. The master judgement device judges whether each of the communication units is to function as the master unit or the slave unit on the basis of the priority data. Thus, the master unit can be automatically selected by the arbitration without any problem.

The above object of the present invention can be also achieved by a first method of communicating data in an on-vehicle data communication system, which is provided with at least one master unit, a plurality of slave units and a communication bus for connecting the master unit and the slave units. The first method is provided with the steps of: transmitting broadcast communication data to the slave units from the master unit; receiving the transmitted broadcast communication data through the communication bus by a first receiving device in each of the slave units; judging whether or not the first receiving device failed to normally receive the broadcast communication data which are supposed to be received by the first receiving device; transmitting acknowledge data to indicate a failure in reception of the first receiving device, if it is judged that the first receiving device failed to normally receive, from each of the slave units; receiving the transmitted acknowledge data by a second receiving device of the master unit; judging whether or not the acknowledge data corresponding to the transmitted broadcast communication data are received; and performing a predetermined process to cope with the failure of the first receiving device if it is judged that the acknowledge data are received.

Consequently, according to the first method of the present invention, the reliability of the broadcast communication can be improved in the same manner as the aforementioned first system of the present invention.

As one aspect of the first method of the present invention, the broadcast communication data may include a data block of control data and a data block of substantial data. In the predetermined process performing step, the data block of substantial data may be transmitted again as the predetermined process, if it is judged that the acknowledge data are transmitted while the data block of substantial data are transmitted. Thus, the broadcast communication data can be certainly received by the slave units even if there happens a failure in reception, while the communication time for transmitting only the same data block of substantial data again can be made relatively short.

The above object of the present invention can be also achieved by a second method of communicating data in an on-vehicle data communication system, which is provided with a plurality of communication units and a communication bus for connecting the communication units to each other. The second method is provided with the steps of: judging whether each of the communication units is to function as a master unit or a slave unit in each communication on the communication bus; transmitting broadcast communication data to the communication units functioning as the slave units, from the communication unit functioning as the master unit; receiving the transmitted broadcast communication data through the communication bus, by a first receiving device of each of the communication units functioning as the slave units; judging whether or not the first receiving device failed to normally receive the broadcast communication data which are supposed to be received by the first receiving device, by each of the communication units functioning as the slave units; transmitting acknowledge data to indicate a failure in reception of the first receiving device, if it is judged that the first receiving device failed to normally receive, from each of the communication units functioning as the slave units; receiving the transmitted acknowledge data by a second receiving device of the communication unit functioning as the master unit; judging whether or not the acknowledge data corresponding to the transmitted broadcast communication data are received by the second receiving device; and performing a predetermined process to cope with the failure of the first receiving device if it is judged that the acknowledge data are received.

Consequently, according to the second method of the present invention, the reliability of the broadcast communication can be improved in the same manner as the aforementioned first method of the present invention.

In one aspect of the second method of the present invention, the broadcast communication data may include priority data to indicate a priority order in an arbitration to use the communication bus. In the master or slave judging step, it is judged whether each of the communication units is to function as the master unit or the slave unit on the basis of the priority data. Thus, the master unit can be automatically selected by the arbitration without any problem.

In the above described first and second system and the first and second method of the present invention, the broadcast communication data may include a header portion indicating a head of the broadcast communication data, a talker address field indicating an address of the master unit, a listener address field indicating an address of each of the slave units, a control field indicating the kind of the broadcast communication data, a data length field for specifying a data length of the broadcast communication data, and a data field for transmitting and receiving substantial data. Thus, an efficient broadcast communication can be established by the broadcast communication data.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

Power Supply of AV System

The principles of the present invention are particularly useful when embodied in an AV (Audio Visual) system on an automobile as the data communication system.

Figure 1:
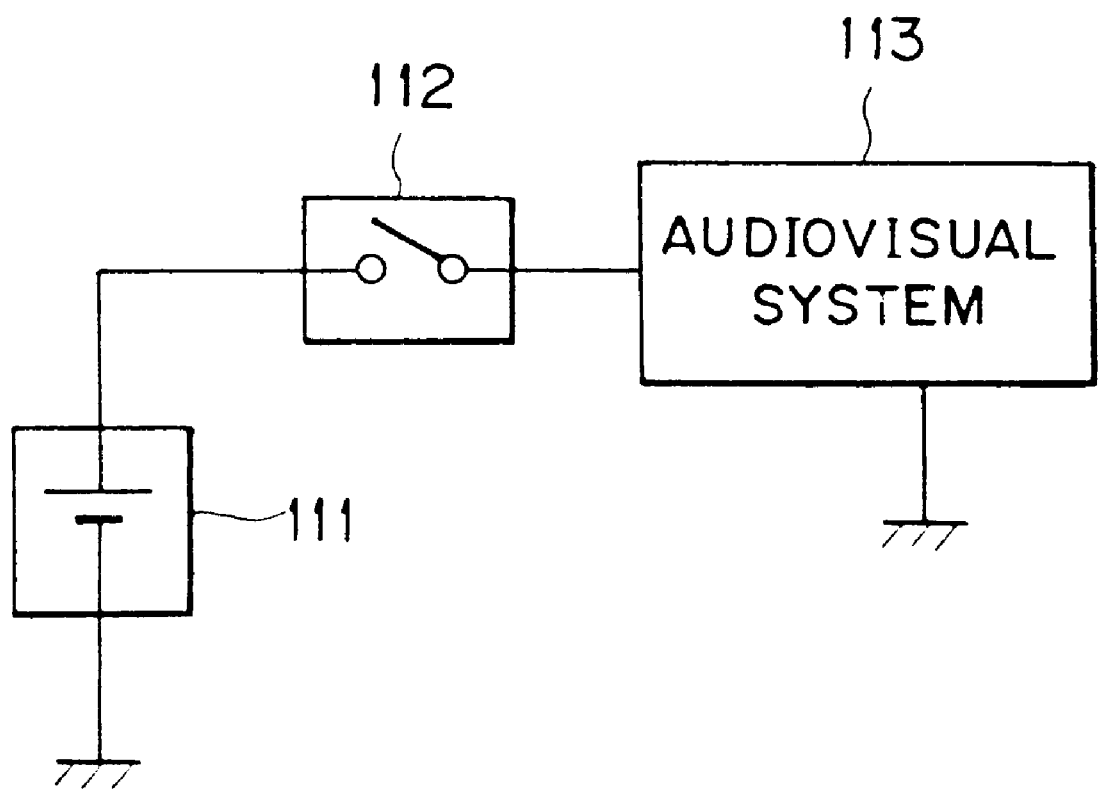
FIG. 1 is a block diagram of a power supply circuit for an AV system as the data communication system of an embodiment of the present invention.

In FIG. 1, an AV system 113 is supplied with electric energy from a battery 111 through an ACC (ACCessory) switch 112. The ACC switch 112 is ganged with an engine start key switch of the automobile. When the engine key inserted in the engine start key switch is turned to the position of the ACC switch, the accessories on the automobile are energized by the battery 111. At the same time, the AV system 113 is also energized by the battery 111.

Arrangement of AV System

Figure 2:
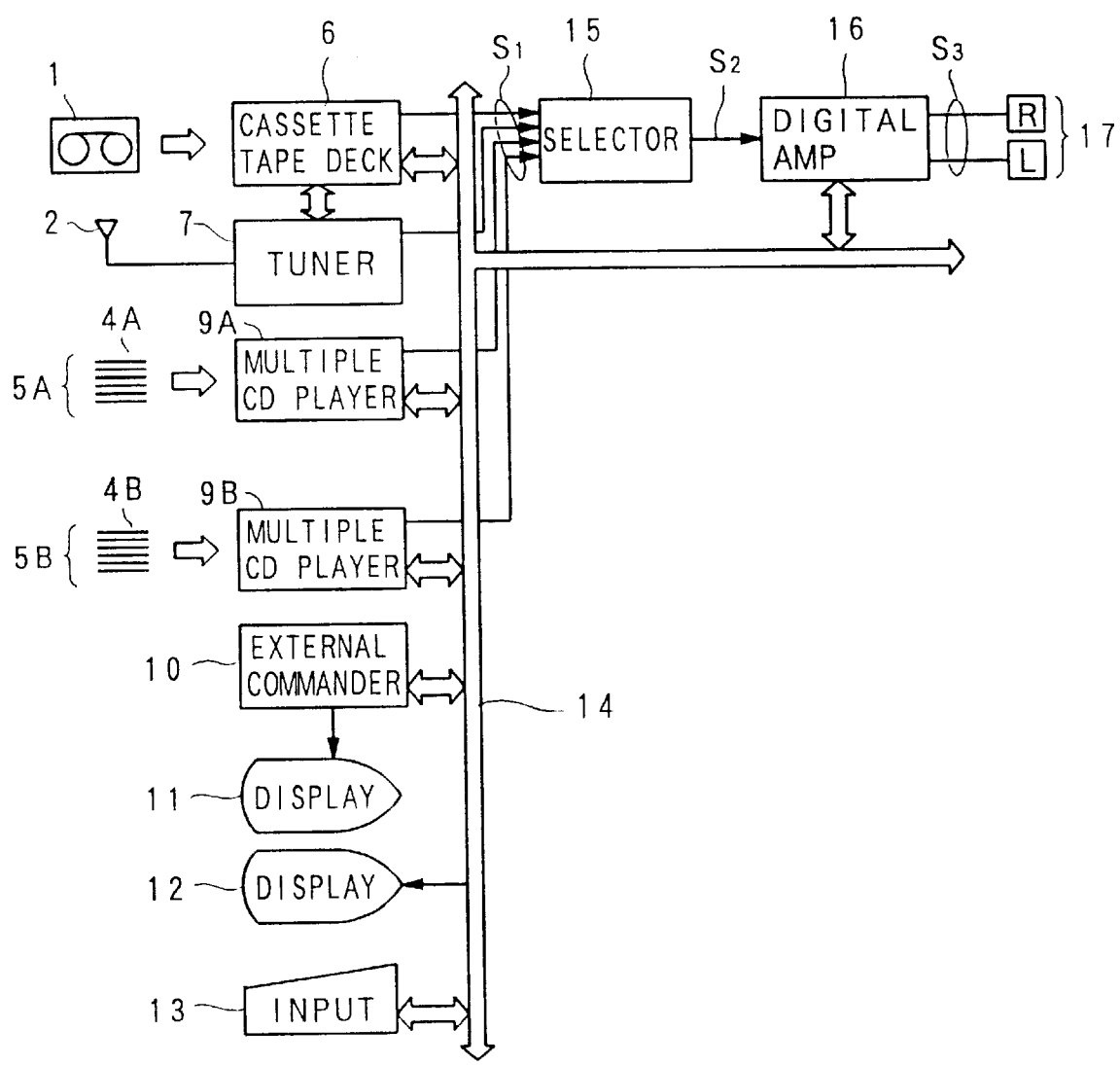
FIG. 2 is a block diagram of the AV system of the embodiment.

FIG. 2 shows a detailed systematic arrangement of the AV system. The AV system has audio reproducing components and visual reproducing components.

In FIG. 2, the audio reproducing components include: a cassette tape deck 6 for reproducing recorded audio signals from a cassette tape 1; an audio tuner contained in a tuner 7 such as an AM/FM tuner for reproducing radio signals which are received by an antenna 2; a multiple CD (Compact Disc) player 9A having an automatic CD changer 5A for reproducing recorded signals from multiple CDs 4A; and a multiple CD player 9B having an automatic CD changer 5B for reproducing recorded signals from multiple CDs 4B. The visual reproducing components include: a TV tuner contained in the tuner 7, for reproducing TV signals received by the antenna 2; and a display unit 12 for displaying images based on the TV signals and also displaying still images based on signals from the CD players 9A and 9B if a CD-ROM is reproduced by the CD player 9A or 9B. Typically, a CD-ROM is employed by a navigation system. The AV system is also provided with: an external commander 10, which is in the form of a keyboard for entering various operation commands; and a display unit 11 connected to the external commander 10. The AV system is further provided with an input unit 13, which may be incorporated in the external commander 10.

Each of the above explained components of the AV system has a controller for controlling its own operation, respectively. The controllers of those components are connected to each other through a communication bus 14, thereby making up a communication bus control network. The control network is shown in FIG. 3, and will be described in detail later on.

On the other hand, reproduced signals $S_1$ from the audio reproducing components are selectively applied through a selector 15 as a reproduced signal $S_2$ to a digital amplifier 16. After the reproduced signal $S_2$ has been amplified by the digital amplifier 16, it is applied as reproduced signals $S_3$ to R (Right) and L (Left) loudspeakers 17 from which the reproduced sounds are generated. The digital amplifier 16 contains a digital signal processing circuit which is controlled by a controller in the digital amplifier 16, the controller being connected to the communication bus 14.

Control Network of AV System

Figure 3:
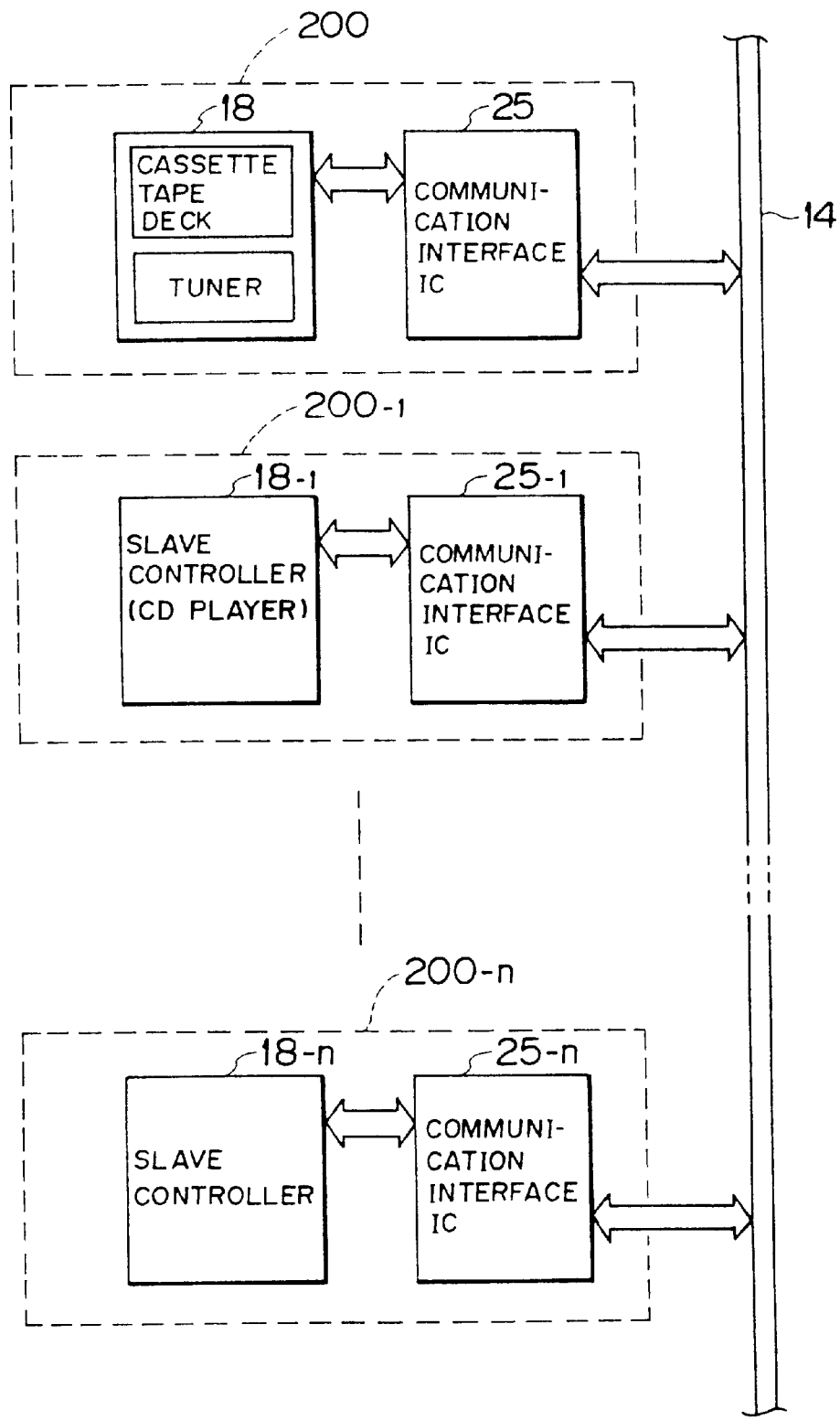
FIG. 3 is a block diagram of a control network of the AV system of the embodiment.

FIG. 3 shows the control network in detail. For the purpose of description, the AV system components connected to the communication bus 14 as shown in FIG. 2 will hereinafter be referred to as "units".

As shown in FIG. 3, these units are connected to the communication bus 14 parallel to each other. Either one of these units is selected as a "master" unit, indicated by 200, for controlling the control network, while the other units serve as "slave" units, indicated by $200_{-1} \sim 200_{-n}$. The master unit 200 has a master controller 18 which is connected through a communication interface IC (Integrated Circuit) 25 to the communication bus 14. The master controller 18 is a controller common for both of the cassette tape deck 6 and the tuner 7. The slave units $200_{-1} \sim 200_{-n}$ have respective slave controllers $18_{-1} \sim 18_{-n}$ which are also connected to the communication bus 14 through respective communication interface ICs $25_{-1} \sim 25_{-n}$.

Figure 4:
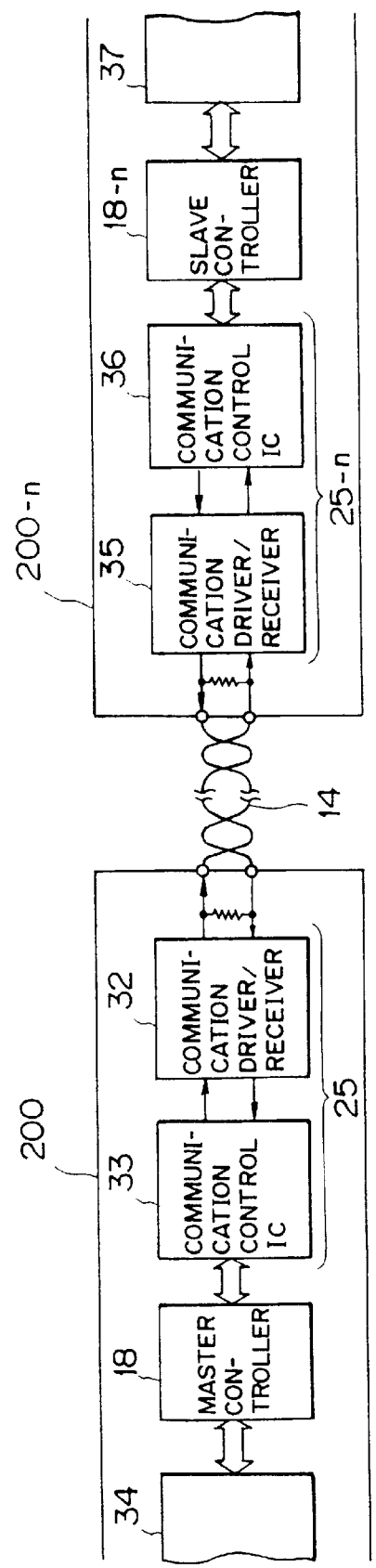
FIG. 4 is a block diagram of a specific arrangement in which a master unit and a slave unit are connected to each other.

FIG. 4 shows a specific arrangement in which the master unit 200 and the slave unit $200_{-n}$ are connected to each other.

In FIG. 4, the master unit 200 and the slave unit $200_{-n}$ are connected to each other by the communication bus 14. The communication bus 14 comprises a twisted pair of conductors or wires. Communication data DT transmitted through the communication bus 14 is transmitted and received by the communication interface ICs 25, $25_{-n}$ of the master unit 200 and the slave unit $200_{-n}$, respectively (see FIG. 3). The communication interface IC 25 is divided into a communication driver/receiver 32 and a communication control IC 33. Likewise, the communication interface IC $25_{-n}$, is divided into a communication driver/receiver 35 and a communication control IC 36. Heretofore, the communication driver/receiver and the communication control IC have been integrally combined in one IC. The communication control IC 33 is composed of a CMOS transistor, while the communication driver/receiver 32 is composed of a bipolar transistor of high current-driven capability. The communication driver/receiver 35 and the communication control IC 36 are of the same structures as the communication driver/receiver 32 and the communication control IC 33. In FIG. 4, reference numerals 34 and 37 denote controlled components.

Figure 5:
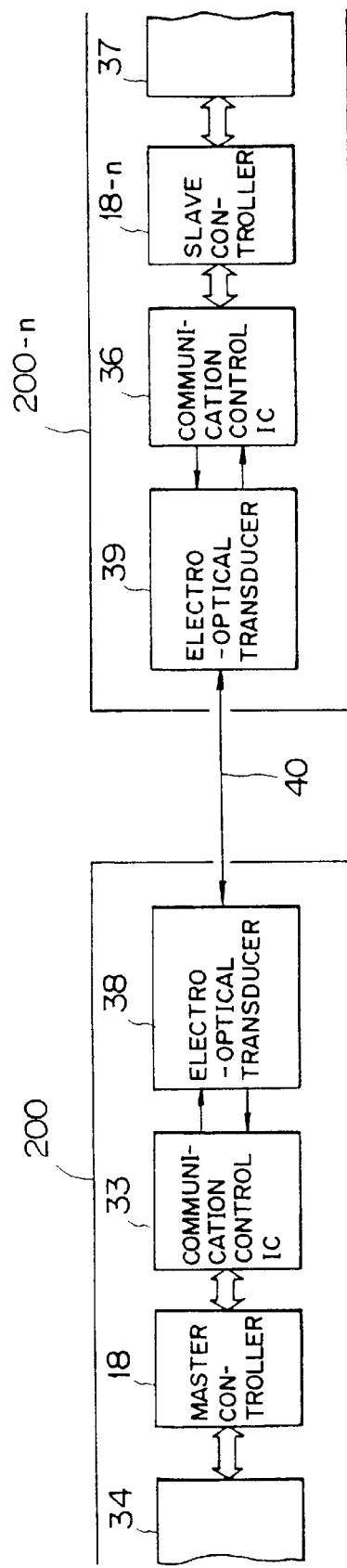
FIG. 5 is a block diagram of another specific arrangement in which a master unit and a slave unit are connected to each other.

The communication interface IC 25, for example, which is divided into the communication control IC 33 and the communication driver/receiver 32, is capable of coping with different transmission mediums for the communication bus 14. In FIG. 4, the communication bus 14 is composed of a twisted pair of conductors or wires for differential transmission. If the communication bus 14 comprises an optical communication cable 40 as shown in FIG. 5, then the communication driver/receiver 32 shown in FIG. 4 may be replaced with an electro-optical transducer 38 with the communication control IC 33 remaining unchanged in the master unit 200. Likewise, the communication driver/receiver 35 shown in FIG. 4 may be replaced with an electro-optical transducer 39 with the communication control IC 36 remaining unchanged in the slave unit $200_{-n}$.

Another advantage is that since the master unit 200 fails due primarily to disturbance noise entering from the communication bus 14, only the communication driver/receiver 32 will malfunction when an excessive signal is applied thereto from the communication bus 14, and replacing the malfunctioning communication driver/receiver 32 with a new one will restore the master unit 200. Consequently, the maintenance of the master unit 200 as well as the slave unit $200_{-n}$ is relatively easy to carry out. The easy maintenance is particularly advantageous with AV systems on automobiles because the master and slave units are exposed to and tend to be damaged by noise induced by the automobile engines.

Furthermore, the fabrication of bipolar transistors and CMOS transistors according to different processes is easier and less expensive than the fabrication of Bi-CMOS ICs.

While only the communication interface IC 25 has been described above, each of the communication interfaces $25_{-1} \sim 25_{-n}$ of the other slave units $200_{-1} \sim 200_{-n}$ is also divided into a communication control IC and a communication driver/receiver.

Transmission Format of Communication Data DT

Nextly, the transmission format of the communication data DT used in the present embodiment will be explained.

Figure 6:
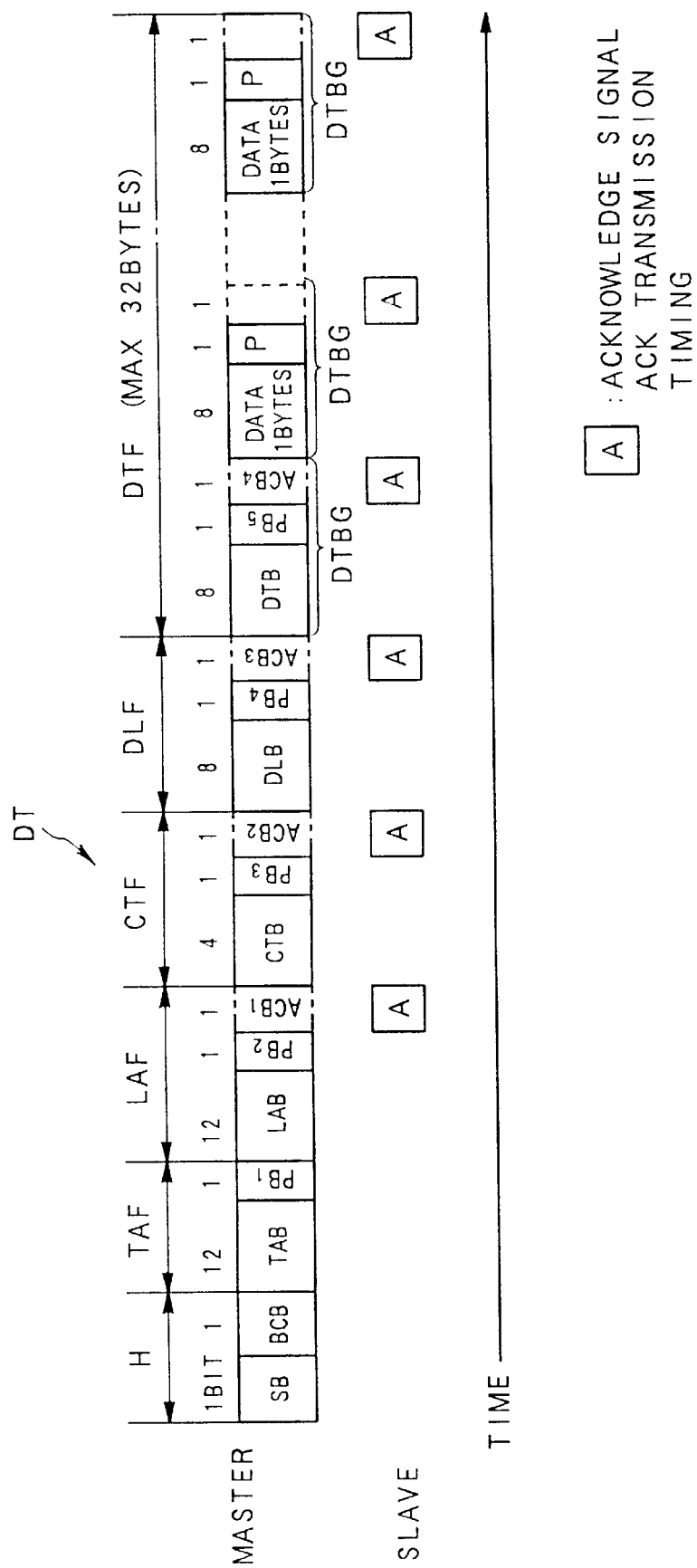
FIG. 6 is a diagram of a transmission format of communication data.

FIG. 6 shows a transmission format of the communication data DT.

In FIG. 6, the communication data DT includes in the order from the head to the tail: a header portion H indicating it is the head of the communication data DT; a talker address field TAF indicating the address of the master unit 200; a listener address field LAF indicating the address of the slave units $200_{-1}$ to $200_{-n}$ to which the communication is to be established; a control field CTF indicating the kind of the data field (e.g. the command or the data) and the data transmission/data request; a data length field DLF for specifying the byte number (i.e. the data length, which is 32 bytes at the maximum in the present embodiment) of a data field DTF of the communication data DT; and the data field DTF for transmitting and receiving the actual data (substantial data) to be transmitted.

The header portion H includes: a start bit SB of 1 bit to inform the start of the data transmission to another unit; and a broadcast communication bit BCB of 1 bit to recognize whether it is the broadcast communication or the ordinary communication. Here, the "ordinary communication" is defined as a communication other than the broadcast communication, i.e. a communication in which the transmission data are transmitted from the master unit to a specified one of the slave units but not to a plurality of slave units at once as in the broadcast communication.

Here, the functions of the start bit SB and the broadcast communication bit BCB are explained.

The start bit SB is outputted for a predetermined time period by the unit (which may function as the master unit or the slave unit) which is about to start the data transmission. In case that a first unit has already been outputting the start bit SB at the timing when a second unit is about to output the start bit SB, the second unit does not output the start bit SB but waits until the output end timing of the start bit SB of the first unit. After that, the second unit starts to output the broadcast communication bit BCB in synchronization with the output end timing of the start bit SB outputted from the first unit.

On the other hand, the units other than a unit, which has transmitted the start bit SB, and a unit, which is about to transmit the start bit SB, detect the transmitted start bit SB and change their condition to the receiving condition.

The bit status "0" of the broadcast communication bit BCB indicates the broadcast communication is to be performed while the bit status "1" of the broadcast communication bit BCB indicates the ordinary communication is to be performed. The priority of the broadcast communication is set higher than the ordinary communication, so that, if a plurality of transmissions of the communication data DT are simultaneously started, the unit which is about to establish the broadcast communication (which bit status of the broadcast communication bit BCB is "0") wins the arbitration (arbitration for the right to use the transmission bus).

The talker address field TAF includes: a talker address bit TAB of 12 bits which expresses the address of the self unit; and a parity bit $PB_1$ of 1 bit corresponding to the talker address bit TAB.

Here, the function of the talker address bit TAB is explained.

The talker address is assigned in the order of the priority to use the transmission bus. Thus, if a plurality of units transmit the bits BCB of the same status (i.e. the statuses of all bits BCB are "0" or the statuses of all bits BCB are "1") at the same timing, the judgement of the arbitration is up to the data content of the talker address bit TAB.

More concretely, in case of constructing the transmission bus by use of the wired AND, a unit which has the minimum talker address (i.e. closest to "0") among the units joining the arbitration will remain as the winner. For example, each time when the talker address bit TAB is transmitted by one bit, each unit compares the talker address bit TAB, which each unit itself has been transmitted, with the talker address bit TAB, which another unit has been transmitted. Then, according to the result of the comparison, if the talker address bit TAB, which each unit itself has been transmitted is "1", while the talker address bit TAB on the transmission bus is "0", each unit judges that each unit itself is the loser of the arbitration and stops the transmission to change its own condition to the receiving condition.

As a result of those procedures, only one of the units remains as the winner of the arbitration when the transmission of the talker address bit TAB of at least 12 bits is completed. This one of the units, which is the winner, outputs the parity bit $PB_1$ to confirm that this one unit itself will function as the master unit 200 and starts to output the listener address field LAF.

The listener address field LAF includes: a listener address bit LAB of 12 bits which specifies the address of the opponent unit to which the communication data are to be transmitted; a parity bit $PB_2$ of 1 bit corresponding to the listener address bit LAB; and an acknowledge bit $ACB_1$ of 1 bit to keep the time interval for judging whether or not the slave unit $200_{-x}$ (x=1 to n), to which the transmission data has been transmitted, has actually received the listener address bit LAB and the parity bit $PB_2$.

Here, the functions of the listener address bit LAB and the acknowledge bit $ACB_1$ are explained.

In case of the ordinary communication, the listener address bit LAB becomes the address data of one slave unit to specify this one slave unit.

In case of the broadcast communication, the listener address bit LAB becomes the broadcast communication address data corresponding to a plurality of slave units to which the broadcast communication data are to be transmitted.

When the transmissions of the listener address bit LAB and the parity bit $PB_2$ are completed, the master unit 200 detects whether or not the acknowledge signal ACK is transmitted from each of the corresponding slave units.

In case of the ordinary transmission, the acknowledge signal ACK which is transmitted from the slave unit indicates that the slave unit has normally received the listener address bit LAB (i.e., the listener address coincides with its own address of the slave unit and the slave unit has normally received the talker address bit TAB and the listener address bit LAB). In case that the acknowledge signal ACK is transmitted during the time period of the acknowledge bit $ACB_1$, the master unit 200 starts to transmit the control field CTF.

In case of the ordinary transmission, if the acknowledge signal ACK is not transmitted during the time period of the acknowledge bit ACBE from the slave unit, the master unit 200 stops the transmission and changes its condition to the waiting condition.

On the contrary, in case of the broadcast communication, the acknowledge signal ACK transmitted from each of the slave units $200_{-x}$ indicates that the slave unit could not normally receive the listener address bit LAB (i.e., the listener address includes its own address of the slave unit, and yet it could not normally receive the talker address bit TAB or the listener address bit LAB). In case that the acknowledge signal ACK is not transmitted during the time period of the acknowledge bit $ACB_1$ (hereinbelow, this case is referred to as the case that a "no-acknowledge signal NACK" is transmitted), the master unit 200 starts to transmit the control field CTF.

In case of the broadcast communication, if the acknowledge signal ACK is transmitted during the time period of the acknowledge bit $ACB_1$ from the slave unit $200_{-x}$ (which corresponds to the case that the no-acknowledge signal NACK is not transmitted), the master unit 200 stops the transmission, and changes its condition to the waiting condition.

The control field CTF includes: a control bit CTB of 4 bits; a parity bit $PB_3$ of 1 bit corresponding the control bit CTB; and an acknowledge bit $ACB_2$ of 1 bit to keep the time interval for judging whether or not the slave unit, to which the communication data DT has been transmitted, has actually received the control bit CTB and the parity bit $PB_3$.

Here, the functions of the control bit CTB and the acknowledge bit $ACB_2$ are explained.

In both cases of the ordinary communication and the broadcast communication, the control bit CTB indicates the kind of the data in the data field DTF and the data transmission/data request.

When the transmission of the control bit CTB and the parity bit $PB_3$ are completed, the master unit 200 detects whether or not the corresponding slave unit $200_{-x}$ transmits the acknowledge signal ACK.

In case of the ordinary communication, the acknowledge signal ACK transmitted from the slave unit $200_{-x}$ indicates that it has normally received the control bit CTB and that it can perform the function requested by the master unit 200. If the acknowledge signal ACK is transmitted during the time period of the acknowledge bit $ACB_2$, the master unit 200 starts to transmit the data length field DLF.

In case of the ordinary communication, if the acknowledge signal ACK is not transmitted during the time period of the acknowledge bit $ACB_2$ from the slave unit $200_{-x}$, the master unit 200 stops the transmission and changes its condition to the waiting condition.

On the contrary, in case of the broadcast communication, the acknowledge signal ACK transmitted from the slave unit $200_{-x}$ indicates that it could not normally receive the control bit CTB or that it cannot perform the function requested by the master unit 200. If the acknowledge signal ACK is not transmitted during the time period of the acknowledge bit $ACB_2$ (which corresponds to the case that the no-acknowledge signal NACK is transmitted), the master unit 200 starts to transmit the data length field DLF.

In case of the broadcast transmission, if the ACK signal is transmitted during the time period of the acknowledge bit $ACB_2$ from the slave unit $200_{-x}$ (which corresponds to the case that the NACK signal is not transmitted), the master unit 200 stops the transmission and changes its condition to the waiting condition.

The data length field DLF includes: a data length bit DLB of 8 bits; a parity bit $PB_4$ of 1 bit corresponding to the data length bit DLB; and an acknowledge bit $ACB_3$ of 1 bit to keep the time interval for judging whether or not the slave unit $200_{-x}$, to which the transmission data has been transmitted, has actually received the data length bit DLB and the parity bit $PB_4$.

Here, the functions of the data length bit DLB and the acknowledge bit $ACB_3$ are explained.

The data length bit DLB indicates the byte number of the communication data DT.

When the transmissions of the data length bit DLB and the parity bit $PB_4$ are completed, the master unit 200 detects whether or not the acknowledge signal ACK is transmitted from the corresponding slave unit $200_{-x}$.

In case of the ordinary transmission, the acknowledge signal ACK, which is transmitted from the slave unit $200_{-x}$, indicates that it has normally received the data length bit DLB. If the acknowledge signal ACK is transmitted during the time period of the acknowledge bit $ACB_3$, the master unit 200 starts to transmit the data field DTF.

In case of the ordinary communication, if the acknowledge signal ACK is not transmitted during the time period of the acknowledge bit $ACB_3$ from the slave unit $200_{-x}$, the master unit 200 stops the transmission and changes its condition to the waiting condition.

On the contrary, in case of the broadcast communication, the acknowledge signal ACK transmitted from the slave unit $200_{-x}$ indicates that it could not normally receive the data length bit DLB. If the acknowledge signal ACK is not transmitted during the time period of the acknowledge bit $ACB_3$ (which corresponds to the case that the no-acknowledge signal NACK is transmitted), the master unit 200 starts to transmit the data field DTF.

In case of the broadcast communication, if the acknowledge signal ACK is transmitted during the time period of the acknowledge bit $ACB_3$ from the slave unit $200_{-x}$ (which corresponds to the case that the no-acknowledge signal NACK is not transmitted), the master unit 200 stops the transmission, and changes its condition to the waiting condition.

The data field DTF has one or more data bit groups DTBG each of which includes: a data bit DTB of 8 bits; a parity bit $PB_5$ of 1 bit corresponding to the bit DTB; and an acknowledge bit $ACB_4$ of 1 bit to keep the time interval for judging whether or not the slave unit, to which the communication data DT has been transmitted, has actually received the bit DTB and the parity bit $PB_5$. In the present embodiment, the maximum length of the data field DTF is set to 32 bytes.

Nextly, the operation related to the data field DTF is explained. The case is explained where the transmission data are transmitted from the master unit 200 to the slave unit $200_{-x}$.

In case of the ordinary communication, when the transmissions of the bit DTB and the parity bit $PB_5$ from the master unit 200 to the slave unit $200_{-x}$ are completed, the master unit 200 detects whether or not the acknowledge signal ACK is transmitted from the corresponding slave unit.

In case of the ordinary communication, the acknowledge signal ACK transmitted from the slave unit indicates that it has normally received the data bit group DTBG (i.e. the parity check is normal and the buffer for receiving has enough empty memory space). If the acknowledge signal ACK is transmitted during the time period of the acknowledge bit $ACB_4$, the master unit 200 starts to transmit the next data bit group DTBG or finishes the communication process if it is the last group.

In case of the ordinary communication, if the acknowledge signal ACK is not transmitted during the time period of the acknowledge bit $ACB_4$ from the slave unit $200_{-x}$, the master unit 200 transmits the same data bit group DTBG again. This re-transmission operation is repeated until it detects that the acknowledge signal ACK is transmitted from the slave unit $200_{-x}$, or until it exceeds a predetermined maximum transmission byte number.

On the contrary, in case of the broadcast communication, the acknowledge signal ACK transmitted from the slave unit $200_{-x}$ indicates that it could not normally receive the data bit group DTBG (i.e. the result of the parity check is abnormal, or the buffer for receiving does not have enough empty memory space). If the acknowledge signal ACK is not transmitted during the time period of the acknowledge bit $ACB_4$ from any one of the slave units (which corresponds to the case that the no-acknowledge signal NACK is transmitted), the master unit 200 starts to transmit the next data bit group DTBG or finishes the transmission process if it is the last group.

In case of the broadcast communication, if the acknowledge signal ACK is transmitted during the time period of the acknowledge bit $ACB_4$ from the slave unit $200_{-x}$ (which corresponds to the case that the no-acknowledge signal NACK is not transmitted), the master unit 200 transmit the same data bit group DTBG again. This re-transmission operation is repeated until the acknowledge signal ACK is transmitted from each of the slave unit $200_{-x}$, or until it exceeds a predetermined maximum transmission byte number.

In this case, the slave unit, which has normally received the data bit group DTBG and does not output the acknowledge signal ACK, judges whether or not other slave units output the acknowledge signal ACK by sampling the data on the transmission bus. If any one of the other slave units outputs the acknowledge signal ACK, the received data bit group DTBG are abandoned. Then, the slave unit operates to receive the same data bit group DTBG again, which is re-transmitted from the master unit 200.

Nextly, the operation of the data communication system of the present embodiment from a view point of one unit (which will be called as a "pertinent unit", hereinbelow) will be explained with referring to flow charts of FIGS. 7 and 8.

Figure 7:
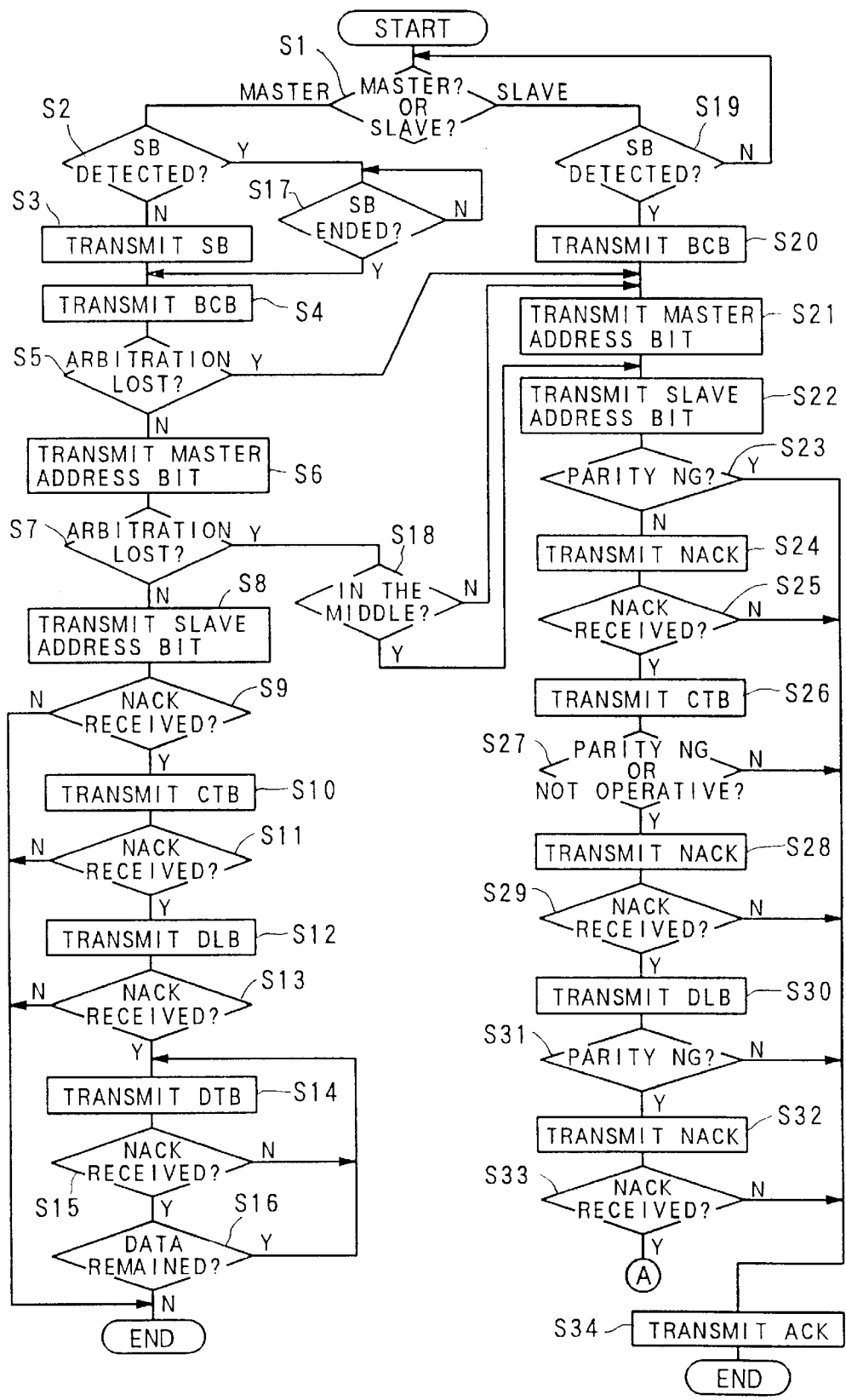
FIG. 7 is one flow chart showing the communication operation of the embodiment.

In FIG. 7, the pertinent unit judges whether or not the pertinent unit itself is to function as the master unit 200 or the slave unit $200_{-x}$ (step S1).

(I) In Case of Functioning as Master Unit

At the step S1, if the pertinent unit is judged to function as the master unit 200, the data on the transmission bus are sampled, so that the pertinent unit judges whether or not the start bit SB can be detected on the transmission bus (step S2).

At the step S2, if the start bit SB is judged to be detected (YES), the pertinent unit waits until the transmission of the start bit SB is ended (step S17). When the transmission of the start bit SB is ended (step S17: YES), the flow branches to a step S4.

At the step S2, if the start bit SB from any one of the other units is not judged to be detected (NO), the pertinent unit starts the transmission of the communication data DT of its own, and the transmission of the start bit SB is performed (step S3).

Nextly, the pertinent unit transmits the broadcast communication bit BCB (step S4). The transmission of the broadcast communication bit BCB at this step S4 and the transmission of the start bit SB at the step S3 are called as the transmission of the header portion H in all.

In this case, the pertinent unit sets the broadcast communication bit BCB="0" in case of the broadcast communication while it sets the broadcast communication bit BCB="1" in cas e of the ordinary communication.

Along with this, the pertinent unit samples the data on the transmission bus, so as to judge whether or not other units output the broadcast communication bit BCB onto the transmission bus. Further, the pertinent unit judges whether the broadcast communication bit BCB on the transmission bus, if any exists, is "0" or "1", so that the pertinent unit judges whether or not the pertinent unit itself is the loser of the arbitration, more concretely, whether or not the status of the sampled broadcast communication bit BCB is "0" and the status of the BCB of its own is "1" (step S5).

At the step S5, if the status of the sampled broadcast communication bit BCB of the other unit is "0" and the status of the broadcast communication bit BCB of its own is "1", since the priority of the other unit is the higher, it is concluded that the pertinent unit has lost th e arbitration (step S5: YES). Thus, the flow branches to a step S21, where the pertinent unit is to function as a slave unit $200_{-x}$.

At the step S5, if the status of the sampled broadcast communication bit BCB is "1" and the status of the broadcast communication bit BCB of its own is "0", or if both of those bits BCB are the same to each other, it is concluded that the pertinent unit has not lost the arbitration, so that the talker address bit TAB as the master address bit is transmitted through the transmission bus (step S6).

The talker address corresponding to the talker address bit TAB expresses the order of the priority of the units, as described before. The pertinent unit samples the data on the transmission bus and compares the priority order of its own with the priority order of the other unit, so that the pertinent unit judges whether or not it is the loser of the arbitration. More concretely, the pertinent unit judges whether or not the value of the talker address of the other unit is greater than that of its own (step S7).

If the pertinent unit has lost the arbitration (step S7: YES), it is to function as the slave unit $200_{-x}$. Thus, the flow branches to a step S18. At the step S18, the pertinent unit further judges whether or not it has lost as a result of comparing all bits of the talker address bit TAB or comparing only partial bits of the talker address bit TAB (i.e. in the middle of the comparison). If the pertinent unit has lost as a result of comparing all bits (step S18: NO), the flow branches to the step S21. If the pertinent unit has lost as a result of comparing only partial bits i.e. in the middle of the comparison (step S18, YES), a flow branches to a step S22.

At the step S7, if it has not lost the arbitration (step S7: NO), it is confirmed that the pertinent unit is to function as the master unit 200, so that the listener address bit LAB as the slave address bit to specify the slave units $200_{-x}$ is transmitted from the pertinent unit i.e. the master unit (step S8).

Nextly, the operation in case of the broadcast communication will be explained.

When the transmission of the listener address bit LAB is completed, the master unit 200 judges whether or not the no-acknowledge signal NACK is transmitted form each slave unit, which constructs the corresponding slave unit group, during the time period of the acknowledge bit $ACB_1$ (step S9).

At the step S9, if the no-acknowledge signal NACK is transmitted i.e. if the master unit 200 receives the no-acknowledge signal NACK (YES), the master unit 200 starts to transmit the control bit CTB in the control field CTF (step S10).

At the step S9, if the no-acknowledge signal NACK is not transmitted i.e. if the master unit 200 does not receive the no-acknowledge signal NACK (NO), the master unit stops the transmission (END) and changes its condition to the waiting condition.

When the master unit 200 completes the transmission of the control bit CTB (step S10), the master unit 200 judges whether or not the no-acknowledge signal NACK is transmitted from each slave unit constructing the corresponding slave unit group during the time period of the acknowledge bit $ACB_1$ (step S11).

At the step S14, if the no-acknowledge signal NACK is transmitted i.e. the no-acknowledge signal NACK is received during the time period of the acknowledge bit $ACB_2$ (YES), the master unit 200 starts to transmit the data length bit DLB in the data length field DLF (step S12).

At the step S11, if the no-acknowledge signal NACK is not transmitted i.e. if the master unit 200 does not receive the no-acknowledge signal NACK during the time period of the acknowledge bit $ACB_2$ (NO), the master unit 200 stops the transmission (END) and changes its condition to the waiting condition.

When the transmission of the data length bit DLB is completed (step S12), the master unit 200 judges whether or not the no-acknowledge signal NACK is transmitted during the time period of the $ACB_3$ from each slave unit constructing the corresponding slave unit group (step S13).

At the step S13, if the no-acknowledge signal NACK is transmitted i.e. if the master unit 200 receives the no-acknowledge signal NACK during the time period of the acknowledge bit $ACB_3$ (YES), the master unit 200 starts to transmit the data bit DTB in the data field DTF (step S14).

At the step S13, if the no-acknowledge signal NACK is not transmitted i.e. if the no-acknowledge signal NACK is not received by the master unit 200 during the time period of the acknowledge bit $ACB_3$, the master unit 200 stops the transmission (END) and changes its condition to the waiting condition.

Nextly, the master unit 200 starts the transmission of the data bit group DTBG (step S14). Each time when the transmission of each data bit group DTBG is completed, the master unit 200 judges whether or not the no-acknowledge signal NACK is transmitted during the time period of the acknowledge bit $ACB_4$ from each slave unit constructing the corresponding slave unit group (step S15).

At the step S15, if the no-acknowledge signal NACK is transmitted from all of the slave units (YES), the master unit 200 judges whether or not there exists any data remaining in the data field DTF (i.e. the remaining data bit group DTBG in the data field DTF) (step S16). If there exists no remaining data (step S16: NO), the transmission process is ended. If there exists the remaining data (YES), the flow returns to the step S14, and the transmission of the next data bit group DTBG is performed.

At the step S15, if the no-acknowledge signal NACK is not received (NO), the master unit 200 transmits the same data bit group DTBG again (step S14). This re-transmission operation is repeated until the master unit detects that the no-acknowledge signal NACK is received from all of the slave units or until it exceeds the maximum transmission bytes number.

In this case, the slave unit, which has normally received the data bit group DTBG and does not output the ACK, can judge bush(ether or not any one of the other slave units outputs the no-acknowledge signal NACK by sampling the data on the transmission bus. If one of the other slave units does not output the no-acknowledge signal NACK, the received data bit group DTBG are abandoned, and the slave unit operates to receive the data bit group DTBG again which is re-transmitted from the master unit 200.

(II) In Case of Functioning as Slave Unit

At the step S1, if the pertinent unit is judged to function as the slave unit $200_{-x}$, the pertinent unit samples the data on the transmission bus to detect the start bit SB (step S19).

At the step S19, if the start bit SB of the other unit is detected, the slave unit $200_{-x}$ receives the broadcast communication bit BCB (step S20).

Nextly, the slave unit $200_{-x}$ receives the talker address bit TAB as the master address bit through the transmission bus (step S21), and receives the listener address bit LAB as the slave address bit (step S22).

The slave unit $200_{-x}$ performs the parity check of the transmitted listener address bit LAB by use of the parity bit $PB_1$, and judges whether or not the parity is abnormal (parity NG) i.e. whether or not the listener address bit LAB could be normally received (step S23).

At the step S23, if the parity is abnormal (YES), the acknowledge signal ACK is transmitted (which corresponds to the case that the no-acknowledge signal NACK is not transmitted) (step S34).

At the step S23, if the parity is normal (NO), the no-acknowledge signal NACK is transmitted (which corresponds to the case that the acknowledge signal ACK is not transmitted), and judges whether or not all of the other corresponding slave units transmit the no-acknowledge signal NACK i.e. whether or not the pertinent slave unit receives the no-acknowledge signal NACK from the other slave units (step S25).

At the step S25, if the pertinent slave unit receives the no-acknowledge signal NACK, it receives the control bit CTB (step 326).

The slave unit $200_{-x}$ performs the parity check of the transmitted control bit CTB by use of the parity bit $PB_2$, and judges whether or not the parity is abnormal (parity NG), or whether or not the pertinent slave unit is operative to perform the function requested by the master unit 200 i.e. whether or not the control bit CTB could not be normally received, or whether or not the slave unit $200_{-x}$ is operative to perform the function requested by the master unit 200 (step S27).

At the step S27, if the parity is abnormal or the slave unit $200_{-x}$ is not operative (NO), the pertinent slave unit transmits the acknowledge signal ACK (which corresponds to the case that the no-acknowledge signal NACK is not transmitted) (step S34).

At the step S27, if the parity is normal and the slave unit $200_{-x}$ is operative (YES), the slave unit $200_{-x}$ transmits the no-acknowledge signal NACK (which corresponds to the case that the acknowledge signal ACK is not transmitted) (step S28), and judges whether or not all of the other corresponding slave units $200_{-x}$ transmit the no-acknowledge signal NACK i.e. whether or not the pertinent slave unit receives the no-acknowledge signal NACK (step S29).

At the judgement S29, if the pertinent slave unit receives the no-acknowledge signal NACK (YES), it receives the data length bit DLB (step S30).

Then, the pertinent salve unit performs the parity check of the transmitted data length bit DLB by use of the parity bit $PB_3$, and judges whether or not the parity is abnormal (parity NG) i.e. whether or not the data length bit DLB could be normally received (step S31).

At the step S31, if the parity is abnormal (NO), the pertinent slave unit transmits the acknowledge signal ACK (which corresponds to the case that the no-acknowledge signal NACK is not transmitted) (step S34).

At the step S31, if the parity is normal (YES), the pertinent slave unit transmits the no-acknowledge signal NACK (which corresponds to the case that the acknowledge signal ACK is not transmitted) (step S32), and judges whether or not all of the other corresponding slave units transmit the no-acknowledge signal NACK i.e. whether or not the pertinent slave unit receives the no-acknowledge signal NACK (step S33).

Figure 8:
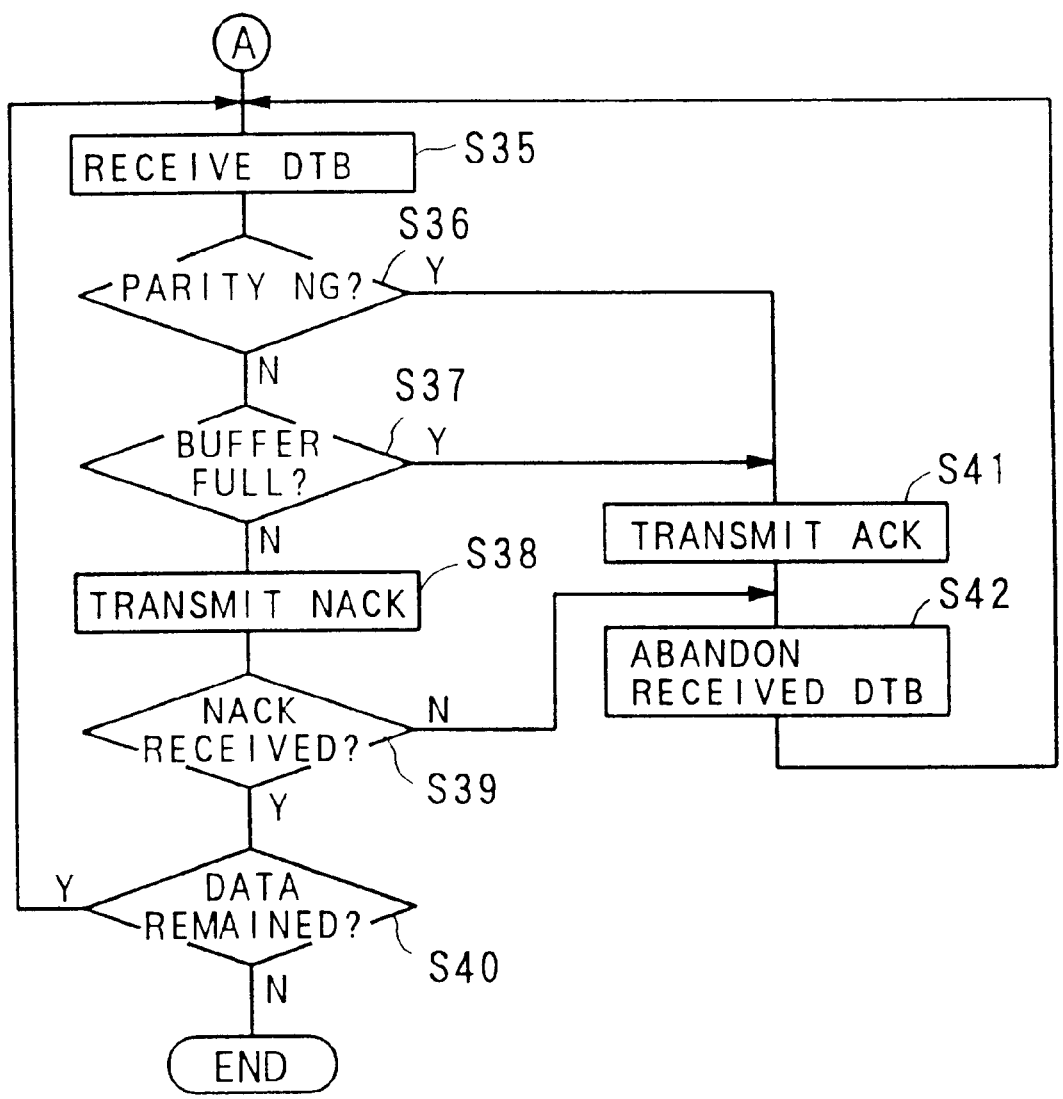
FIG. 8 is another flow chart showing the communication operation of the embodiment.

At the step S33, if the slave unit receives the no-acknowledge signal NACK (YES), the flow proceeds to a step S35 in FIG. 8.

In FIG. 8, at the step S35, the pertinent slave unit receives the data bit group DTBG (step S35).

Then, the pertinent slave unit performs the parity check of the transmitted data bit DTB by use of the parity bit $PB_4$, to judge whether or not the parity is abnormal (parity NG) i.e. whether or not the bit DTB could be normally received (step S36).

At the step S36, if the parity is abnormal (YES), it transmits the acknowledge signal ACK (which corresponds to the case that the no-acknowledge signal NACK is not transmitted) (step S41), and abandons the received bit DTB (step S42), and the flow returns to the step S35 to receive the bit DTB again.

At the step S36, if the parity is normal (NO), it is judged whether or not there is enough empty memory space in the buffer for receiving (step S37).

At the step S37, if there is no enough empty memory space in the buffer for receiving (i.e. buffer full) (YES), the flow branches to the step S41. Then, the pertinent slave unit transmits the acknowledge signal ACK (which corresponds to the case that the no-acknowledge signal NACK is not transmitted) (step S41), and abandons the received bit DTB (step S42). Then, the flow returns to the step S35 to receive the bit DTB again.

At the step S37, if there is enough empty memory space in the buffer for receiving (NO), the pertinent slave unit transmits the no-acknowledge signal NACK (which corresponds to the case that the acknowledge signal ACK is not transmitted) (step S38), and judges whether or not all of the other corresponding slave units $200_{-x}$ transmit the no-acknowledge signal NACK i.e. whether or not the pertinent slave unit receives the no-acknowledge signal NACK (step S39).

At the step S39, if the pertinent slave unit receives the no-acknowledge signal NACK (YES), it judges whether or not there exists any remaining data (remaining data bit group DTBG) in the received data field DTF (step S40).

At the step S40, if there exists remaining data, the flow returns to the step S35 and the processes from the step S35 to the step S40 are repeated, so that the remaining data bit group DTBG are received.

At the step S39, if the slave unit does not receive the no-acknowledge signal NACK (NO), since it can be concluded that there exists a slave unit which could not receive the bit DTB, the pertinent slave unit abandons the received bit DTB (step S42), and the flow returns to the step S35 to receive the data bit group transmitted from the master unit 200 again.

As described above, according to the present embodiment, even if there exists a slave unit, to which the master unit has tried to transmit the broadcast communication data but which has failed to receive it, the master unit can still recognizes the fact that the slave unit has failed to receive it, and performs a predetermined error curing process such as transmitting the same data again, so that the reliability in the broadcast communication can be improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An on-vehicle data communication system comprising at least one master unit, a plurality of slave units and a communication bus for connecting said master unit with said slave units, said system performing a broadcast communication, in which said master unit simultaneously transmits first communication data to all of said slave units, and an ordinary communication, in which said master unit transmits second communication data to specific one of said slave units, each of said slave units comprising:
    a first receiving means for receiving said first communication data through said communication bus in case of said broadcast communication, and for receiving said second communication data through said communication bus in case of said ordinary communication; and
    a first transmission means for transmitting first acknowledge data to indicate a failure in reception of said first receiving means if said first receiving means fails to normally receive said first communication data in case of said broadcast communication, and for transmitting second acknowledge data to indicate a success in reception of said first receiving means if said first receiving means normally receives said second communication data in case of said ordinary communication, said master unit comprising:
    a second transmission means for transmitting said first communication data to all of said slave units in case of broadcast communication, and for transmitting said second communication data to said specific one of said slave units in case of said ordinary communication;
    a second receiving means for receiving said transmitted first acknowledge data in case of said broadcast communication, and for receiving said transmitted second acknowledge data in case of said ordinary communication; and
    a process control means for performing a first predetermined process to cope with the failure of said first receiving means if said second receiving means receives said first acknowledge data corresponding to said transmitted first communication data in case of said broadcast communication, and for performing a second predetermined process to cope with a failure of said first receiving means if said second receiving means fails to receive said second acknowledge data corresponding to said transmitted second communication data in case of said ordinary communication.

2. An on-vehicle data communication system according to claim 1, wherein:

each of said first communication data and said second communication data comprise a data block of control data and a data block of substantial data; and said process control means controls said second transmission means to transmit said data block of substantial data of said first communication data again as said first predetermined process if said second receiving means receives said first acknowledge data while said data block of substantial data of said first communication data are transmitted in case of said broadcast communication, and controls said second transmission means to transmit said data block of substantial data of said second communication data again as said second predetermined process if said second receiving means fails to receive said second acknowledge data while said data block of substantial data of second communication data are transmitted in case of said ordinary communication.

3. An on-vehicle communication system according to claim 1, wherein each of said first communication data and said second communication data have data to differentiate said first communication data and said second communication data from each other.

4. An on-vehicle communication system according to claim 1, wherein each of said master unit and said slave units comprises a controller for each on-vehicle audiovisual component.

5. A method of communicating data in an on-vehicle data communication system comprising at least one master unit, a plurality of slave units and a communication bus for connecting said master unit with said slave units, said system performing a broadcast comnmunication, in which said master unit simultaneously transmits first communication data to all of said slave units, and an ordinary communication, in which said master unit transmits second communication data to specific one of said slave units, said method comprising the steps of:

firstly transmitting said first communication data from said master unit to all of said slave units in case of broadcast communication, and transmitting said second communication data from said master unit to said specific one of said slave units in case of said ordinary communication;

firstly receiving said transmitted first communication data through said communication bus by each of said slave units in case of said broadcast communication, and receiving said transmitted second communication data through said communication bus by said specific one of said slave units in case of said ordinary communication;

secondly transmitting first acknowledge data to indicate a failure in reception of at least one of said slave units if at least said one of said slave units fails to normally receive said transmitted first communication data in case of said broadcast communication in said firstly receiving step, and transmitting second acknowledge data to indicate a success in reception of said specific one of said slave units if said specific one of said slave units normally receives said transmitted second communication data in case of said ordinary communication in said firstly receiving step;

secondly receiving said transmitted first acknowledge data by said master unit in case of said broadcast communication, and receiving said transmitted second acknowledge data by master unit in case of said ordinary communication; and performing a first predetermined process to cope with the failure in said firstly receiving step if said master unit receives said first acknowledge data corresponding to said transmitted first communication data in case of said broadcast communication in said second receiving step, and performing a second predetermined process to cope with a failure in said firstly receiving step if said master units fails to receive said second acknowledge data corresponding to said transmitted second communication data in case of said ordinary communication in said second receiving step.

6. A method according to claim 5, wherein:

each of said first communication data and said second communication data comprise a data block of control data and a data block of substantial data; and in said performing step, said data block of substantial data of said first communication data are transmitted again as said first predetermined process if said master unit receives said first acknowledge data while said data block of substantial data of said first communication data are transmitted in case of said broadcast communication in said secondly receiving step, and said data block of substantial data of said second communication data are transmitted again as said second predetermined process if said master unit fails to receive said second acknowledge data while said data block of substantial data of second communication data are transmitted in case of said ordinary communication in said secondly receiving step.

* * * * *